US012784932B2

(12) United States Patent
Hori et al.

(10) Patent No.: US 12,784,932 B2
(45) Date of Patent: Nov. 3, 2026

(54) ELECTRIC WIRE

(71) Applicant: SUMITOMO ELECTRIC INDUSTRIES, LTD., Osaka (JP)

(72) Inventors: Kenji Hori, Tochigi (JP); Ryota Fukumoto, Osaka (JP); Nayu Yanagawa, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 131 days.

(21) Appl. No.: 18/579,965

(22) PCT Filed: Jul. 26, 2022

(86) PCT No.: PCT/JP2022/028814
§ 371 (c)(1),
(2) Date: Jan. 17, 2024

(87) PCT Pub. No.: WO2023/008442
PCT Pub. Date: Feb. 2, 2023

(65) Prior Publication Data

US 2024/0339240 A1 Oct. 10, 2024

(30) Foreign Application Priority Data

Jul. 28, 2021 (JP) ................................ 2021-122964

(51) Int. Cl.

| | |
|---|---|
| ***H01B 3/00*** | (2006.01) |
| ***H01B 3/44*** | (2006.01) |
| ***H01B 7/295*** | (2006.01) |

(52) U.S. Cl.
CPC ............ *H01B 3/002* (2013.01); *H01B 3/441* (2013.01); *H01B 7/295* (2013.01)

(58) Field of Classification Search
CPC ........... H01B 3/00; H01B 3/441; H01B 7/295
See application file for complete search history.

(56) References Cited

U.S. PATENT DOCUMENTS

| | | | | |
|---|---|---|---|---|
| 2016/0032191 A1* | 2/2016 | Carlson | ................ | A62D 1/0007 252/604 |
| 2019/0112230 A1* | 4/2019 | Auvray | .................. | H01B 7/295 |
| 2022/0157493 A1* | 5/2022 | Park | ....................... | H01B 11/10 |
| 2023/0111479 A1* | 4/2023 | Auvray | .................. | H01B 3/006 174/121 A |

FOREIGN PATENT DOCUMENTS

| | | |
|---|---|---|
| JP | 2010-027387 | 2/2010 |
| JP | 2013-241510 | 12/2013 |
| WO | 2015/144690 | 10/2015 |

* cited by examiner

*Primary Examiner* — Chau N Nguyen
(74) *Attorney, Agent, or Firm* — IPUSA, PLLC

(57) ABSTRACT

An electric wire includes a conductor, and a cover layer that covers an outer surface of the conductor. The cover layer includes a polyolefin-based resin and a biomass material. A content percentage of the biomass material in the polyolefin-based resin and the biomass material is 45% by mass or less.

6 Claims, 1 Drawing Sheet

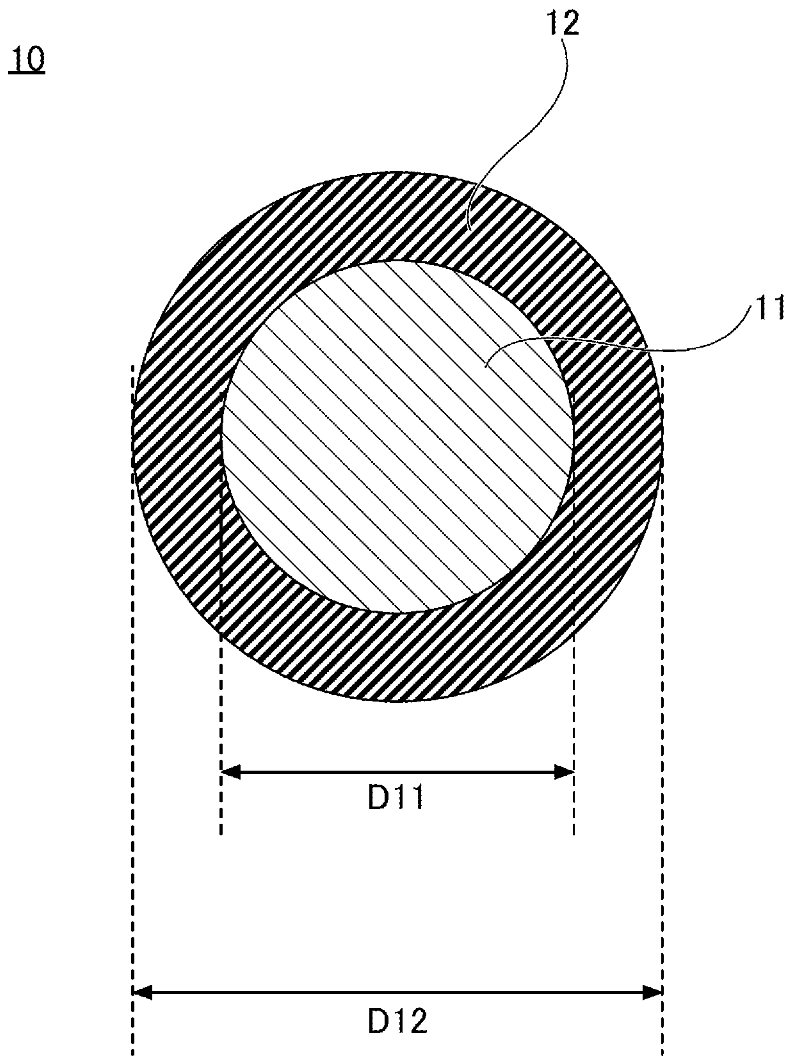
10
12
11
D11
D12

ELECTRIC WIRE

TECHNICAL FIELD

The present disclosure relates to electric wires.

The present application claims priority to Japanese Patent Application No. 2021-122964, filed on Jul. 28, 2021, and the contents of this Japanese patent application are incorporated herein by reference in their entirety.

BACKGROUND ART

Patent Literature 1 discloses an electric wire/cable filler including: a core wire formed of a paper material and having a circular cross section; and a bioplastic layer that covers the entire circumferential surface of the core wire.

CITATION LIST

Patent Literature

Patent Literature 1 Japanese Laid-Open Patent Publication No. 2010-027387

SUMMARY OF INVENTION

An electric wire of the present disclosure includes a conductor and a cover layer that covers an outer surface of the conductor. The cover layer includes a polyolefin-based resin and a biomass material. A content percentage of the biomass material in the polyolefin-based resin and the biomass material is 45% by mass or less.

BRIEF DESCRIPTION OF DRAWINGS

FIG. 1 is a cross-sectional view of an electric wire according to one aspect of the present disclosure, as taken along a plane perpendicular to a longitudinal direction of the electric wire.

DESCRIPTION OF EMBODIMENTS

Objects to be Solved by the Present Disclosure

Nowadays, the attention given to environmental issues is especially high. For this reason, like, for example, the electric wire/cable filler disclosed in Patent Literature 1, an electronic member using bioplastics or the like has been studied so as to reduce the environmental load.

However, there has been no report on an electric wire in which a biomass material is used for a cover layer or the like.

In view thereof, it is an object of the present disclosure to provide an electric wire using a biomass material.

Effects of the Present Disclosure

According to the present disclosure, it is possible to provide an electric wire using a biomass material.

DESCRIPTION OF EMBODIMENTS OF THE PRESENT DISCLOSURE

First, embodiments of the present disclosure will be listed and described. In the following description, the same or corresponding elements are provided with the same reference signs, and the same description thereof is not repeated.

(1) An electric wire according to one aspect of the present disclosure includes:

a conductor; and a cover layer that covers an outer surface of the conductor, in which the cover layer includes a polyolefin-based resin and a biomass material, and a content percentage of the biomass material in the polyolefin-based resin and the biomass material is 45% by mass or less.

The biomass material is an organic resource derived from animals and plants, and includes no petroleum-derived material. The biomass material may also be referred to simply as biomass.

When the cover layer of the electric wire according to one aspect of the present disclosure includes the biomass material, which is not an exhaustible resource, and the content percentage of the petroleum-derived resin component is reduced, it is possible to suppress the environmental load.

Also, carbon dioxide generated by burning the biomass material is carbon dioxide absorbed and fixed in the growing process of the biomass material. Therefore, the carbon dioxide generated by burning the biomass material does not increase carbon dioxide in the atmosphere.

Therefore, when the cover layer includes the biomass material and uses a reduced amount of the resin component, an increase in the amount of carbon dioxide in the atmosphere can be suppressed even if the cover layer portion is burned in order to, for example, dispose of the electric wire including the cover layer. Therefore, also from this point of view, the electric wire according to one aspect of the present disclosure can suppress the environmental load.

However, when the biomass material is added to the cover layer, elongation characteristics of the cover layer may be insufficient. Therefore, when the electric wire provided with the cover layer including the biomass material is, for example, bent in order to attach the electric wire to various devices, the cover layer may be, for example, damaged.

However, when the content percentage of the biomass material in the polyolefin-based resin and the biomass material is 45% by mass or less, the elongation characteristics of the cover layer are sufficiently enhanced. As a result, it is possible to prevent damage or the like of the cover layer even if the electric wire is, for example, bent in order to attach the electric wire to various devices. Therefore, when in the cover layer, the content percentage of the biomass material in the polyolefin-based resin and the biomass material is 45% by mass or less, it is possible to obtain an electric wire that has a suppressed environmental load and exhibits sufficient performance.

(2) The polyolefin-based resin need not be crosslinked.

When the polyolefin-based resin is not crosslinked, i.e., is a non-crosslinked polyolefin-based resin, the elongation characteristics of the cover layer can be particularly enhanced. Therefore, it is possible to increase the content percentage of the biomass material in the cover layer, and particularly reduce the environmental load.

(3) The polyolefin-based resin may be crosslinked, and the content percentage of the biomass material in the polyolefin-based resin and the biomass material may be 38% by mass or less.

When the polyolefin-based resin is crosslinked, the heat resistance of the electric wire can be enhanced. However, when the polyolefin-based resin is crosslinked, the elongation characteristics of the cover layer are likely to get reduced. This is why the content percentage of the biomass material is preferably reduced. In view thereof, when the content percentage of the biomass material in the polyolefin-based resin and the biomass material is 38% by mass or less, the elongation characteristics of the cover layer are particularly enhanced. As a result, it is possible to prevent damage or the like of the cover layer even if the electric wire is, for example, bent in order to attach the electric wire to various devices. Therefore, when the polyolefin-based resin is crosslinked, when in the cover layer, the content percentage of the biomass material in the polyolefin-based resin and the biomass material is 38% by mass or less, it is possible to obtain an electric wire that has a suppressed environmental load and excellent heat resistance, and exhibits sufficient performance.

(4) The cover layer may further include a flame retardant, and the content percentage of the biomass material in the polyolefin-based resin, the biomass material, and the flame retardant may be 15% by mass or less.

When the cover layer includes a flame retardant, flame retardancy of the electric wire can be enhanced. However, when the cover layer includes a flame retardant, the elongation characteristics of the cover layer are likely to get reduced. This is why the content percentage of the biomass material is preferably reduced. In view thereof, when the content percentage of the biomass material in the polyolefin-based resin, the biomass material, and the flame retardant is 15% by mass or less, the elongation characteristics of the cover layer are particularly enhanced. As a result, it is possible to prevent damage or the like of the cover even if the electric wire is, for example, bent in order to attach the electric wire to various devices. Therefore, when the cover layer includes a flame retardant, when in the cover layer, the content percentage of the biomass material in the polyolefin-based resin, the biomass material, and the flame retardant is 15% by mass or less, it is possible to obtain an electric wire that has a suppressed environmental load and excellent flame retardancy, and exhibits sufficient performance.

(5) The biomass material may be rice.

Compared to other biomass materials, rice is readily available and is excellent in handleability. Therefore, by using rice as the biomass material, the productivity of the electric wire can be enhanced and the production cost can be suppressed.

(6) A particle diameter of the biomass material may be 500 μm or less.

When the particle diameter of the biomass material is 500 μm or less, the electric wire including the biomass material in the cover layer thereof can be enhanced in mechanical strength and electrical characteristics, and the elongation characteristics of the cover layer can be particularly enhanced.

DETAILS OF EMBODIMENTS OF THE PRESENT DISCLOSURE

Specific examples of the electric wire according to one embodiment of the present disclosure (hereinafter referred to as "the present embodiment") will be described below with reference to the drawings. Note that, the present invention is not limited to these examples, but is intended to encompass all changes within the meaning and scope that are recited in the claims and are equivalent to the claims.

[Electric Wire]

FIG. 1 illustrates a configurational example of a cross section that is perpendicular to a longitudinal direction of the electric wire of the present embodiment. The longitudinal direction of the electric wire is a direction that is perpendicular to the paper surface in FIG. 1.

As illustrated in FIG. 1, an electric wire 10 of the present embodiment may include a conductor 11, and a cover layer 12 that covers an outer surface of the conductor 11.

(1) Regarding Members Included in the Electric Wire

The members included in the electric wire of the present embodiment will be described.

(1-1) Conductor

The conductor 11 may include a single metal strand or a plurality of metal strands. When the conductor 11 includes a plurality of metal strands, the plurality of metal strands may be twisted. That is, when the conductor 11 includes a plurality of metal strands, the conductor 11 may also be a twisted wire of the plurality of metal strands.

No particular limitation is imposed on the material of the conductor 11, but one or more conductor materials selected from, for example, copper, soft copper, silver-plated soft copper, nickel-plated soft copper, and tin-plated soft copper may be used.

No particular limitation is imposed on an outer diameter D11 of the conductor 11, but the outer diameter D11 thereof is preferably, for example, 0.12 mm or more and 5.20 mm or less.

(1-2) Cover Layer

As illustrated in FIG. 1, the cover layer 12 may cover the outer surface of the conductor 11, and specifically may cover the outer surface thereof along the longitudinal direction of the electric wire 10. The cover layer 12 may include the polyolefin-based resin, which is a resin component described below, and the biomass material.

No particular limitation is imposed on an outer diameter D12 of the cover layer 12, but the outer diameter D12 thereof may be, for example, 0.2 mm or more and 8 mm or less.

(1-2-1) Resin Component

The cover layer 12 may include a resin component. From the viewpoint of suppressing generation of, for example, dioxin upon burning or the like and particularly reducing the environmental load, the cover layer 12 is preferably reduced in the content of halogen components and more preferably includes no halogen components, i.e., halogen-free. Note that, the expression "includes no halogen components" means that a halogen-containing component is not intentionally added, and does not exclude inclusion of a halogen-containing component as an unavoidable component. Therefore, the resin component is preferably reduced in the content of halogen components and more preferably includes no halogen components. The cover layer 12 preferably includes a polyolefin-based resin as the resin component. Note that, the cover layer 12 can include a polyolefin-based resin alone as the resin component.

No particular limitation is imposed on the polyolefin-based resin. Examples of the polyolefin-based resin include polyethylene (PE); ethylene acrylate copolymers such as ethylene-vinyl acetate copolymers (EVA) and ethylene-ethyl acrylate copolymers (EEA); ethylene α-olefin copolymers, ethylene methyl acrylate copolymers, ethylene butyl acrylate copolymers, ethylene methyl methacrylate copolymers, ethylene acrylic acid copolymers, partially saponified EVAs, maleic anhydride modified polyolefins, ethylene acrylate maleic anhydride copolymers, and the like. These resins may be used alone or may be used as a mixture of two or more.

The polyolefin-based resin, which is the resin component, may be crosslinked or may not be crosslinked.

However, when the polyolefin-based resin is not crosslinked, i.e., is a non-crosslinked polyolefin-based resin, the elongation characteristics of the cover layer can be particularly enhanced. Therefore, it is possible to increase the content percentage of the below-described biomass material in the cover layer, and particularly reduce the environmental load.

Also, when the polyolefin-based resin is crosslinked, the heat resistance of the electric wire 10 can be enhanced. Therefore, when the electric wire 10 is used for applications in which heat resistance is required, the polyolefin-based resin is preferably crosslinked.

(1-2-2) Biomass Material

The cover layer 12 can include the biomass material. The biomass material is an organic resource derived from animals and plants, and includes no petroleum-derived material. The biomass material may also be referred to simply as biomass.

When the cover layer 12 includes the biomass material, which is not an exhaustible resource, and the content percentage of the petroleum-derived resin component is reduced, it is possible to suppress the environmental load.

Also, carbon dioxide generated by burning the biomass material is carbon dioxide absorbed and fixed in the growing process of the biomass material. Therefore, the carbon dioxide generated by burning the biomass material does not increase carbon dioxide in the atmosphere.

Therefore, when the cover layer 12 includes the biomass material and uses a reduced amount of the resin component, an increase in the amount of carbon dioxide in the atmosphere can be suppressed even if the cover layer 12 portion is burned in order to, for example, dispose of the electric wire 10 including the cover layer 12. Therefore, also from this point of view, the electric wire 10 according to the present embodiment can suppress the environmental load.

No particular limitation is imposed on the biomass material, but, for example, one or more selected from rice, chaff, rice straw, wheat straw, coffee beans, wood, buckwheat chaff, bamboo, and the like can be used. In particular, the biomass material is preferably rice. Compared to other biomass materials, rice is readily available and is excellent in handleability. Therefore, by using rice as the biomass material, the productivity of the electric wire can be enhanced and the production cost can be suppressed.

In the electric wire 10 of the present embodiment, the biomass material can be used as is without being converted to other compounds. That is, when, for example, the biomass material is rice, the biomass material can be used in the form of rice rather than plastics produced from biomass materials, e.g., bioplastics. Therefore, according to the electric wire of the present embodiment, it is possible to save energy required to produce the biomass material into bioplastics or the like, and in particular, reduce the environmental load. Note that, if necessary, the biomass material may be subjected to milling, sieving, and the like to adjust and select the size thereof for use. No particular limitation is imposed on the particle diameter of the biomass material, but the particle diameter is preferably equal to or less than a certain value. Specifically, for example, the particle diameter of the biomass material is preferably 500 μm or less. When the particle diameter of the biomass material is 500 μm or less, the electric wire including the biomass material in the cover layer thereof can be particularly enhanced in mechanical strength and electrical characteristics, and the elongation characteristics of the cover layer are particularly enhanced. However, when a biomass material having too small a particle diameter is sought for, a biomass material having a large particle diameter is removed, and a usable biomass material is reduced. From this point of view, the biomass material preferably has a particle diameter of 1 μm or more.

Note that, the particle diameter in the present specification means a particle diameter measured by the laser diffraction/scattering method.

However, when the biomass material is added to the cover layer, the elongation characteristics of the cover layer may be insufficient. Therefore, when the electric wire provided with the cover layer including the biomass material is, for example, bent in order to attach the electric wire to various devices, the cover layer may be, for example, damaged.

In view thereof, the inventors of the present invention conducted studies, and have found that the elongation characteristics of the cover layer can be sufficiently enhanced by adjusting the content percentage of the biomass material in a predetermined range. The present invention has been completed.

In the cover layer 12 of the electric wire 10 of the present embodiment, the content percentage of the biomass material in the polyolefin-based resin and the biomass material is preferably 45% by mass or less and more preferably 40% by mass or less. When the content percentage of the biomass material in the polyolefin-based resin and the biomass material is 45% by mass or less, the elongation characteristics of the cover layer are sufficiently enhanced, and it is possible to prevent damage or the like of the cover layer 12 even if the electric wire is, for example, bent in order to attach the electric wire to various devices. Therefore, when in the cover layer 12, the content percentage of the biomass material in the polyolefin-based resin and the biomass material is 45% by mass or less, it is possible to obtain the electric wire 10 that has a suppressed environmental load and exhibits sufficient performance.

The content percentage of the biomass material in the polyolefin-based resin and the biomass material being 45% by mass or less means that when the total of the content percentages of the polyolefin-based resin and the biomass material is 100% by mass, the content percentage of the biomass material is 45% by mass or less.

When the polyolefin-based resin included in the cover layer 12 is not crosslinked and the cover layer 12 includes no flame retardant, the cover layer 12 exhibits sufficient elongation characteristics as long as the content percentage of the biomass material is in the above range. Therefore, it is possible to reliably prevent damage or the like of the cover layer 12 even if the electric wire 10 is, for example, bent in order to attach the electric wire to various devices. However, when the polyolefin-based resin is crosslinked or when the cover layer 12 includes a flame retardant, the elongation characteristics of the cover layer 12 may become degraded.

As described above, the polyolefin-based resin, which is the resin component, may be crosslinked. When the polyolefin-based resin is crosslinked in this way, the content percentage of the biomass material in the polyolefin-based resin and the biomass material is preferably 38% by mass or less and more preferably 35% by mass or less. By crosslinking the polyolefin-based resin, it is possible to enhance the heat resistance of the electric wire 10. However, when the polyolefin-based resin is crosslinked, the elongation characteristics of the cover layer 12 are likely to get degraded, and thus the content of the biomass material is preferably reduced. Then, when the content percentage of the biomass material in the polyolefin-based resin and the biomass material is 38% by mass or less, the elongation characteristics of the cover layer are particularly enhanced, and it is possible to prevent damage or the like of the cover layer 12 even if the electric wire 10 is, for example, bent in order to attach the electric wire to various devices. Therefore, when the polyolefin-based resin is crosslinked, when in the cover layer 12, the content percentage of the biomass material in the polyolefin-based resin and the biomass material is 38% by mass or less, it is possible to obtain an electric wire that has a suppressed environmental load and excellent heat resistance, and exhibits sufficient performance.

As described below, the cover layer 12 may include a flame retardant. That is, the cover layer 12 may include the polyolefin-based resin, the biomass material, and the flame retardant. When the cover layer 12 includes the flame retardant, the content percentage of the biomass material in the polyolefin-based resin, the biomass material, and the flame retardant is preferably 15% by mass or less and more preferably 10% by mass or less. When the cover layer 12 includes the flame retardant, the flame retardancy of the electric wire can be enhanced. However, when the cover layer 12 includes the flame retardant, the elongation characteristics of the cover layer 12 are likely to get degraded, and thus the content of the biomass material is preferably reduced. Then, when the content percentage of the biomass material is 15% by mass or less in the polyolefin-based resin, the biomass material, and the flame retardant, the elongation characteristics of the cover layer 12 are particularly enhanced. Therefore, it is possible to prevent damage or the like of the cover layer 12 even if the electric wire 10 is, for example, bent in order to attach the electric wire to various devices. Therefore, when the cover layer 12 includes the flame retardant, when in the cover layer, the content percentage of the biomass material in the polyolefin-based resin, the biomass material, and the flame retardant is 15% by mass or less, it is possible to obtain an electric wire that has a suppressed environmental load and excellent flame retardancy, and exhibits sufficient performance.

Note that, when the cover layer 12 includes the flame retardant, the cover layer 12, specifically, the polyolefin-based resin, which is the resin component, may be crosslinked or may not be crosslinked.

The content percentage of the biomass material in the polyolefin-based resin, the biomass material, and the flame retardant being 15% by mass or less means that when the total of content percentages of the polyolefin-based resin, the biomass material, and the flame retardant is 100% by mass, the content percentage of the biomass material is 15% by mass or less.

No particular limitation is imposed on the lower limit of the content percentage of the biomass material of the cover layer 12 as long as the content percentage of the biomass material in the polyolefin-based resin and the biomass material is more than 0% by mass. However, especially from the viewpoint of suppressing the environmental load, the content percentage of the biomass material in the polyolefin-based resin and the biomass material is preferably 5% by mass or more and more preferably 10% by mass or more.

When the cover layer 12 includes the flame retardant, no particular limitation is imposed on the lower limit of the content percentage of the biomass material as long as the content percentage of the biomass material in the polyolefin-based resin, the biomass material, and the flame retardant is more than 0% by mass. In particular, the content percentage of the biomass material is preferably 5% by mass or more and more preferably 10% by mass or more.

(1-2-3) Additives

In addition to the resin component and the biomass material as described above, the cover layer 12 may also include various additives. The cover layer 12 may include, for example, a flame retardant and the like, as the additives.

(Flame Retardant)

No particular limitation is imposed on the flame retardant. However, as described above, the cover layer 12 is preferably reduced in the content of halogen components and more preferably includes no halogen components. Therefore, the flame retardant for use is preferably a non-halogen-based flame retardant rather than a halogen-based flame retardant.

For this reason, the cover layer 12 may include, as the flame retardant, for example, one or more selected from phosphorus-based flame retardants; nitrogen-based flame retardants; and metal hydroxides and metal oxides such as magnesium hydroxide, aluminum hydroxide, and antimony trioxide.

(Other Additives)

The cover layer 12 may consist of the polyolefin-based resin and the biomass material as described above, or may consist of the polyolefin-based resin, the biomass material, and the flame retardant. However, the cover layer 12 may further include additives. The cover layer 12 may include, for example, antioxidants, deterioration inhibitors, colorants, crosslinking aids, tackifiers, lubricants, softeners, fillers, process aids, coupling agents, and the like, which are commonly formulated in cover layers.

Examples of the antioxidants include phenol-based antioxidants, amine-based antioxidants, sulfur-based antioxidants, phosphite ester-based antioxidants, and the like.

Examples of the deterioration inhibitors include HALS (hindered amine-based photostabilizers), ultraviolet absorbers, metal deactivators, hydrolysis inhibitors, and the like.

Examples of the colorants include carbon black, titanium white, other organic and inorganic pigments, and the like. These may be added for identification or for ultraviolet absorption.

When the resin component of the cover layer 12, i.e., the polyolefin-based resin thereof, is crosslinked, in order to increase the crosslinking efficiency, the crosslinking aid may be added at a ratio of 1 part by mass or more and 10 parts by mass or less per 100 parts by mass of the resin component included in the cover layer 12. Examples of the crosslinking aid include triallyl isocyanurate, triallyl cyanurate, trimethylolpropane trimethacrylate, N, N'-methaphenylene bismaleimide, ethylene glycol dimethacrylate, zinc acrylate, zinc methacrylate, and the like.

Examples of the tackifiers include coumarone-indene resins, polyterpene resins, xylene formaldehyde resins, hydrogenated rosin, and the like. Examples of the lubricants include fatty acids, unsaturated fatty acids, metal salts thereof, fatty acid amides, fatty acid esters, and the like. Examples of the softeners include mineral oils, vegetable oils, plasticizers, and the like. Examples of the fillers include calcium carbonate, talc, clay, silica, zinc oxide, molybdenum oxide, and the like. As the coupling agent, a silane coupling agent, or a titanate-based coupling agent such as isopropyl triisostearoyl titanate, isopropyl tri (N-aminoethyl-aminoethyl) titanate, or the like, may be added, if necessary.

EXAMPLES

The present invention will be described below by way of specific examples, but the present invention is not limited to these examples.

(Evaluation Methods)

First, evaluation methods of electric wires produced in the following Experimental Examples will be described.

(1) Outer Diameter of Conductor and Outer Diameter of Cover Layer

The outer diameter D11 of the conductor 11 and the outer diameter D12 of the cover layer 12 were measured with a micrometer.

Specifically, for the outer diameter D11 of the conductor 11, the outer diameter of the conductor 11 was measured with a micrometer along two orthogonal diameters of the electric wire 10 in a given cross section perpendicular to the longitudinal direction of the electric wire 10. An average value of the measurements was defined as the outer diameter D11 of the conductor 11 included in the electric wire 10. The outer diameter D12 of the cover layer 12 was measured and calculated in the same manner.

Note that, the thickness of the cover layer 12 was obtained by subtracting the outer diameter D11 of the conductor 11 from the outer diameter D12 of the cover layer 12, followed by being divided by two.

(2) Elongation

The conductor was taken out from the produced electric wire. A tensile test of the cover layer was performed according to 4.16 of JIS C 3005 (2014) (tensile properties of insulator and sheath), thereby calculating the elongation.

Test conditions were as follows: tensile speed=500 mm/min, distance between reference lines=25 mm, and temperature=23° C. The elongation was measured for 10 samples produced under the same conditions in each Experimental Example. An average of the measurements of the 10 samples was defined as the elongation of the cover layer in the Experimental Example.

Regarding the elongation, larger values thereof mean more excellent elongation characteristics. When the elongation is 95% or higher, the cover layer is regarded to have elongation characteristics suitable for use in the electric wire. When the elongation is 100% or higher, the cover layer is regarded to have sufficient elongation characteristics.

(3) Test for Flame Retardancy

The VW-1 vertical flame test described in UL standard 2556 was performed for five samples produced under the same conditions for the electric wire of each Experimental Example. A sample that was regarded as passing the test was as follows. Specifically, after the sample was burned for a period of 15 seconds repeatedly five times, the sample extinguished within 60 seconds, and cotton wool laid underneath the sample was not burned by burning fallen matter and Kraft paper attached to the upper part of the sample was not burned or scorched. Five samples were evaluated, and the case in which all of the five samples passed was evaluated as "A", and the cases in which at least any one of the samples failed was evaluated as "B". Note that, in the following Experimental Examples, the cases in which the evaluation was "B" were that all of the five samples failed. The evaluation results are presented in the row of "Flame retardancy" in Table 1 to Table 3.

(4) Test for Heat Resistance

Heat resistance was evaluated by a test according to UL standard 758 under the condition of 90° C. Specifically, a sample (length: about 100 mm), which was the cover layer alone of the electric wire produced in each Experimental Example, was heat-treated with a Geer oven under the condition of 90° C. in the above UL standard. Then, the initial tensile strength and elongation of a sample that is not heat-treated and the tensile strength and elongation thereof after the above heat treatment were used to calculate a residual tensile strength rate (%) and a residual elongation rate (%) from formula (1) and formula (2) below.

An electric wire in which the calculated residual tensile strength rate was 70% or higher and the calculated residual elongation rate was 70% or higher, was evaluated as "A". Also, an electric wire in which either one or both of the residual tensile strength rate and the residual elongation rate was or were not 70% or higher, was evaluated as "B".

$$\text{Residual tensile strength rate (\%)} = 100\times(\text{Tensile strength after heat treatment})/(\text{Initial tensile strength}) \quad (1)$$

$$\text{Residual elongation rate (\%)} = 100\times(\text{Elongation after heat treatment})/(\text{Initial elongation}) \quad (2)$$

The evaluation "A" means superiority in heat resistance, and the evaluation "B" means inferiority in heat resistance. The evaluation results are presented in the row of "Heat resistance" in Table 1 to Table 3.

(5) Electrical Characteristics (5-1) Insulation Resistance

By the method according to 4.7 (insulation resistance) of JIS C 3005 (2014), insulation resistance was measured under the conditions of 40° C. in temperature and 60 kV/mm in electrical field intensity.

(5-2) In-water withstand pressure By the method according to 4.6 (withstand voltage) of JIS C 3005 (2014), the test was performed under the conditions of 3 kVAC and one minute. Three samples were evaluated, and the number of samples that passed the test was counted. The evaluation results of the evaluated samples are presented in the row of "Withstand voltage" in Table 4.

Also, the breakdown voltage was measured by increasing the voltage. The evaluation results of the evaluated samples are presented in the row of "Breakdown voltage" in Table 4.

In the following, electric wires in Experimental Examples will be described.

Experimental Example 1

Electric wires of Experimental Example 1-1 to Experimental Example 1-9 were produced and evaluated in the above-described manner. Experimental Example 1-1 to Experimental Example 1-3, Experimental Example 1-5, Experimental Example 1-7, and Experimental Example 1-9 are Working Examples, and Experimental Example 1-4, Experimental Example 1-6, and Experimental Example 1-8 are Comparative Examples.

Experimental Example 1-1

In Experimental Example 1-1, an insulating electric wire including the conductor 11 and the cover layer 12 covering the outer surface of the conductor 11 as illustrated in FIG. 1 in the cross section perpendicular to the longitudinal direction, was produced.

(Conductor)

As the conductor 11, a twisted wire in which seven strands of tin-plated soft copper wires having a strand diameter of 0.254 mm were twisted together, was used. The outer diameter D11 of the conductor 11 was 0.76 mm. Note that, in the following other Experimental Examples, the conductor having the same configuration and the same size was used.

(Cover Layer)

LDPE (low density polyethylene), which was the resin component, and rice, which was the biomass material, were fed to an extruder and kneaded, and molded so as to cover the outer surface of the conductor 11, thereby forming the cover layer 12. Note that, rice that had previously been milled to have a particle diameter 500 μm or less, was used. The resin component used is described in the row of Mixed resin in Table 1. The outer diameter D12 of the cover layer 12 was 1.3 mm, and the thickness of the cover layer 12 was 0.270 mm. In the following other Experimental Examples 1-2 to Experimental Example 1-9, Experimental Example 2, and Experimental Example 3, the outer diameter D12 of the cover layer 12 of the produced electric wire 10, and the thickness of the cover layer 12 were the same as described above.

The resin component and the biomass material were fed to the extruder so that the content percentage of the biomass material in the resin component and the biomass material would be 40% by mass, followed by kneading. The content percentage of the biomass material in the resin component and the biomass material is described in the row of "Percentage of biomass material" in Table 1.

Note that, as illustrated in Table 1 in which "Not performed" is described in the row of Crosslinking and "Not added" is described in the row of Flame retardant, the resin component was not crosslinked and the flame retardant was not added to the cover layer 12.

The obtained electric wire was subjected to the test for elongation, the test for flame retardancy, and the test for heat resistance. The evaluation results are presented in Table 1.

Experimental Example 1-2 to Experimental Example 1-4

Electric wires were each produced and evaluated in the same manner as in Experimental Example 1-1 except that the content percentage of the biomass material in the resin component and the biomass material fed to the extruder was changed so as to be the value as presented in Table 1. The evaluation results are presented in Table 1.

The electric wires of Experimental Example 1-3 were evaluated for electrical characteristics. The evaluation results are presented in Table 4.

Experimental Example 1-5 and Experimental Example 1-6

Electric wires were each produced and evaluated in the same manner as in Experimental Example 1-1 except that an ethylene-vinyl acetate copolymer (EVA) was used as the resin component, and the resin component and the biomass material were fed to the extruder so that the content percentage of the biomass material in the resin component and the biomass material would be the percentage presented in Table 1, followed by kneading. The evaluation results are presented in Table 1.

Experimental Example 1-7 and Experimental Example 1-8

An ethylene-ethyl acrylate copolymer (EEA) was used as the resin component, and the resin component and the biomass material were fed to the extruder so that the content percentage of the biomass material in the resin component and the biomass material would be the percentage presented in Table 1, followed by kneading. In the same manner as in Experimental Example 1-1 except for the above, electric wires were each produced and evaluated. The evaluation results are presented in Table 1.

Experimental Example 1-9

Electric wires were each produced and evaluated under the same conditions as in Experimental Example 1-1 except that the particle diameter of the biomass material was 600 μm or less. The evaluation results are presented in Table 1.

TABLE 1

| | | Experimental Example 1-1 | Experimental Example 1-2 | Experimental Example 1-3 | Experimental Example 1-4 | Experimental Example 1-5 |
|---|---|---|---|---|---|---|
| Cover layer | Percentage of biomass material (% by mass) | 40 | 30 | 20 | 50 | 40 |
| | Mixed resin | LDPE | LDPE | LDPE | LDPE | EVA |
| | Crosslinking | Not performed | Not performed | Not performed | Not performed | Not performed |
| | Flame retardant | Not added | Not added | Not added | Not added | Not added |
| Evaluation results | Elongation (%) | 115 | 220 | 305 | 50 | 119 |
| | Flame retardancy | B | B | B | B | B |
| | Heat resistance | B | B | B | B | B |

| | | Experimental Example 1-6 | Experimental Example 1-7 | Experimental Example 1-8 | Experimental Example 1-9 |
|---|---|---|---|---|---|
| Cover layer | Percentage of biomass material (% by mass) | 50 | 40 | 50 | 40 |
| | Mixed resin | EVA | EEA | EEA | LDPE |
| | Crosslinking | Not performed | Not performed | Not performed | Not performed |

TABLE 1-continued

| | | | | | |
|---|---|---|---|---|---|
| | Flame retardant | Not added | Not added | Not added | Not added |
| Evaluation results | Elongation (%) | 47 | 114 | 49 | 98 |
| | Flame retardancy | B | B | B | B |
| | Heat resistance | B | B | B | B |

According to Table 1, when the polyolefin-based resin was used as the resin component, regardless of the type of the resin, it could be confirmed that the cover layer exhibited a sufficient elongation of 95% or more when the content percentage of the biomass material in the resin component and the biomass material was 45% by mass or less. Also, when the particle diameter of the biomass material was 500 μm or less, it could be confirmed that the elongation characteristics of the cover layer could be increased and the cover layer exhibited a sufficient elongation of 100% or more. It could therefore be confirmed that such electric wires could suppress damage or the like of the cover layer even if the electric wires are, for example, bent in order to attach the electric wires to various devices, and also could suppress the environmental load.

Experimental Example 2

Electric wires of Experimental Example 2-1 to Experimental Example 2-6 were produced and evaluated in the above-described manner. Experimental Example 2-1 to Experimental Example 2-4, and Experimental Example 2-6 are Working Examples, and Experimental Example 2-5 is a Comparative Example.

Experimental Example 2-1 to Experimental Example 2-5

The content percentage of the biomass material in the resin component and the biomass material fed to the extruder was changed so as to be the value presented in Table 2. Also, after the cover layer was formed with the extruder so as to cover the outer surface of the conductor 11, the resin component was crosslinked through irradiation with electron beams. In the same manner as in Experimental Example 1-1 except for the above, electric wires were each produced and evaluated. The evaluation results are presented in Table 2.

The electric wires of Experimental Example 2-3 were evaluated for electrical characteristics. The evaluation results are presented in Table 4.

Experimental Example 2-6

Electric wires were each produced and evaluated in the same manner as in Experimental Example 2-1 except that an ethylene-vinyl acetate copolymer (EVA) was used as the resin component, and the resin component and the biomass material were fed to the extruder so that the content percentage of the biomass material in the resin component and the biomass material would be 35% by mass, followed by kneading. The evaluation results are presented in Table 2.

TABLE 2

| | | Experimental Example 2-1 | Experimental Example 2-2 | Experimental Example 2-3 | Experimental Example 2-4 | Experimental Example 2-5 | Experimental Example 2-6 |
|---|---|---|---|---|---|---|---|
| Cover layer | Percentage of biomass material (% by mass) | 35 | 30 | 20 | 10 | 40 | 35 |
| | Mixed resin | LDPE | LDPE | LDPE | LDPE | LDPE | EVA |
| | Crosslinking | Performed | Performed | Performed | Performed | Performed | Performed |
| | Flame retardant | Not added | Not added | Not added | Not added | Not added | Not added |
| Evaluation results | Elongation (%) | 121 | 179 | 280 | 401 | 87 | 133 |
| | Flame retardancy | B | B | B | B | B | B |
| | Heat resistance | A | A | A | A | A | A |

According to Table 2, when the polyolefin-based resin was used as the resin component and was crosslinked, regardless of the type of the resin, it could be confirmed that the cover layer exhibited a sufficient elongation of 100% or more when the content percentage of the biomass material in the resin component and the biomass material was 38% by mass or less. It could therefore be confirmed that such electric wires could suppress damage or the like of the cover layer even if the electric wires are, for example, bent in order to attach the electric wires to various devices, and also could suppress the environmental load.

Furthermore, when crosslinking was performed, the evaluation of heat resistance was "A" and it could be confirmed that the electric wires were excellent in heat resistance.

Experimental Example 3

Electric wires of Experimental Example 3-1 to Experimental Example 3-3 were produced and evaluated in the above-described manner. Experimental Example 3-1 and Experimental Example 3-2 are Working Examples, and Experimental Example 3-3 is a Comparative Example.

Experimental Example 3-1 to Experimental Example 3-3

An ethylene-vinyl acetate copolymer (EVA) was used as the resin component, and a flame retardant was used in addition to the resin component and the biomass material. Metal hydroxide was used as the flame retardant, and was added at a ratio of 200 parts by mass per 100 parts by mass of the resin component. The content percentage of the biomass material in the resin component, the biomass material, and the flame retardant fed to the extruder was adjusted to be the value presented in Table 3. Also, after the cover layer was formed with the extruder so as to cover the outer surface of the conductor 11, the resin component was crosslinked through irradiation with electron beams. In the same manner as in Experimental Example 1-1 except for the above, electric wires were each produced and evaluated. The evaluation results are presented in Table 3.

The electric wires of Experimental Example 3-1 were evaluated for electrical characteristics. The evaluation results are presented in Table 4.

TABLE 3

| | | Experimental Example 3-1 | Experimental Example 3-2 | Experimental Example 3-3 |
|---|---|---|---|---|
| Cover layer | Percentage of biomass material (% by mass) | 10 | 5 | 20 |
| | Mixed resin | EVA | EVA | EVA |
| | Crosslinking | Performed | Performed | Performed |
| | Flame retardant | Added | Added | Added |
| Evaluation results | Elongation (%) | 108 | 175 | 79 |
| | Flame retardancy | A | A | A |
| | Heat resistance | A | A | A |

According to Table 3, when the cover layer includes the resin component, the biomass material, and the flame retardant, and crosslinking was performed, it could be confirmed that the cover layer exhibited a sufficient elongation of 100% or more when the content percentage of the biomass material in the resin component, the biomass material, and the flame retardant was 15% by mass or less. It could therefore be confirmed that such electric wires could suppress damage or the like of the cover layer even if the electric wires are, for example, bent in order to attach the electric wires to various devices, and also could suppress the environmental load.

Note that, when the cover layer includes the flame retardant in addition to the resin component and the biomass material, and crosslinking is not performed, the cover layer exhibits the elongation characteristics that are more excellent than in the above Experimental Examples. Therefore, when the content percentage of the biomass material in the resin component, the biomass material, and the flame retardant is 15% by mass or less, the cover layer can be expected to similarly exhibit a sufficient elongation of 100% or more.

Furthermore, it could be confirmed that by performing crosslinking, the evaluation of heat resistance was "A" and by adding the flame retardant, the evaluation of flame retardancy was "A". That is, it could be confirmed that the electric wires of Experimental Example 3-1 and Experimental Example 3-2 were the electric wires that were excellent in heat resistance and flame retardancy.

TABLE 4

| | | | Experimental Example 1-3 | Experimental Example 2-3 | Experimental Example 3-1 |
|---|---|---|---|---|---|
| Insulation resistance | | MΩ-km | 12068 | 24127.5 | 374.2 |
| In-water withstand pressure | Withstand voltage | Pass/N in number | 3/3 | 3/3 | 3/3 |
| | Breakdown voltage | kVAC | 17.5 | 19.7 | 11.8 |

According to the results of Table 4 about Experimental Example 1-3, Experimental Example 2-3, and Experimental Example 3-1, the insulation resistance was sufficiently high. In a test for in-water withstand pressure, all of three samples subjected to the evaluation passed, and thus it could also be confirmed that the cover layer had sufficient insulation characteristics. It can similarly be confirmed that the cover layer in the other Experimental Examples also has sufficient insulation characteristics.

REFERENCE SIGNS LIST

10 electric wire
11 conductor
12 cover layer
D11 outer diameter of conductor
D12 outer diameter of cover layer

The invention claimed is:

1. An electric wire, comprising:
a conductor; and
a cover layer disposed in direct contact with an outer surface of the conductor, wherein:
the cover layer includes a polyolefin-based resin, a biomass material, and a flame retardant;
the biomass material is rice;
a content percentage of the biomass material, relative to a total amount of the polyolefin-based resin, the biomass material, and the flame retardant, is 10% by mass or less;
the biomass material is used without being converted into another compound and is used in a crushed form;
a particle diameter of the biomass material is 500 μm or less as measured by a laser diffraction or a scattering method;
a thickness of the cover layer is 0.27 mm or less; and
an elongation of the cover layer as measured according to JIS C 3005 (2014) is 100% or more.

2. The electric wire according to claim 1, wherein the polyolefin-based resin is not crosslinked.

3. The electric wire according to claim 1, wherein the polyolefin-based resin is crosslinked.

4. The electric wire according to claim 1, wherein the cover layer is an outermost layer of the electric wire.

5. An electric wire, comprising:
a conductor; and
a cover layer disposed in direct contact with an outer surface of the conductor, wherein:
the cover layer includes a polyolefin-based resin and a biomass material;
the biomass material is rice;
the polyolefin-based resin is crosslinked;

a content percentage of the biomass material, relative to a total amount of the polyolefin-based resin and the biomass material, is 38% by mass or less;

the biomass material is used without being converted into another compound and is used in a crushed form;

a particle diameter of the biomass material is 500 μm or less as measured by a laser diffraction or a scattering method;

a thickness of the cover layer is 0.27 mm or less; and an elongation of the cover layer as measured according to JIS C 3005 (2014) is 100% or more.

6. The electric wire according to claim 5, wherein the cover layer is an outermost layer of the electric wire.

* * * * *